United States Patent [19]

Wilson et al.

[11] Patent Number: 5,433,938
[45] Date of Patent: Jul. 18, 1995

[54] CHLORINE-DESTRUCT METHOD

[75] Inventors: Richard L. Wilson, Mulvane; David A. Hildebrand, Wichita, both of Kans.

[73] Assignee: Vulcan Chemicals, Birmingham, Ala.

[21] Appl. No.: 965,183

[22] Filed: Oct. 23, 1992

[51] Int. Cl.$^6$ .............................................. C01B 11/02
[52] U.S. Cl. .................... 423/478; 423/477; 423/241
[58] Field of Search ................ 423/241, 477, 478, 479

[56] References Cited

U.S. PATENT DOCUMENTS

| | | | |
|---|---|---|---|
| 2,036,311 | 4/1936 | White . | |
| 2,036,375 | 4/1936 | Vincent . | |
| 2,043,284 | 6/1936 | Cunningham et al. | 423/477 |
| 2,078,045 | 4/1937 | Vincent . | |
| 2,317,443 | 4/1943 | Cummingham . | |
| 2,335,808 | 11/1943 | Soule | 423/478 |
| 2,481,241 | 9/1949 | Rapson et al. | 423/241 |
| 2,641,528 | 6/1953 | Audoynaud . | |
| 2,833,624 | 5/1958 | Sprauer | 423/478 |
| 2,861,871 | 11/1958 | Germano . | |
| 2,871,097 | 1/1959 | Rapson . | |
| 3,607,027 | 9/1971 | Westerlund . | |
| 4,010,112 | 3/1977 | Cowley et al. | 423/477 |
| 4,137,296 | 1/1979 | Glew et al. . | |
| 4,216,195 | 8/1980 | Jaszka et al. . | |
| 4,393,035 | 7/1983 | Fredette . | |
| 4,393,036 | 7/1983 | Fredette . | |
| 4,421,730 | 12/1983 | Isa et al. . | |
| 4,543,243 | 9/1985 | Frohler et al. . | |
| 5,154,910 | 10/1992 | Engstrom | 423/478 |

FOREIGN PATENT DOCUMENTS

| | | | |
|---|---|---|---|
| 994525 | 8/1976 | Canada . | |
| 1118580 | 6/1982 | Canada . | |
| 0465447A1 | 1/1992 | European Pat. Off. | 423/478 |

OTHER PUBLICATIONS

Webster's Third New International Dictionary of the English Language Unabridged, p. 185 (1976).

*Primary Examiner*—Benjamin R. Fuller
*Assistant Examiner*—Valerie Ann Lund
*Attorney, Agent, or Firm*—Louis Weinstein

[57] ABSTRACT

An improvement is provided in a process for the preferential removal of chlorine from an aqueous solution of chlorine dioxide and chlorine which has been prepared by the process of reducing a chlorate with a reducing agent in a strong acid, and wherein the gases produced thereby are dissolved in water. The improvement comprises the step of adding hydrogen peroxide, oxalic acid or a salt of oxalic acid, to a cool (i.e. at a temperature of about 0° C. to about 25° C.) aqueous solution of the chlorine within a period of less than 2.5 hours dioxide and chlorine. Substantially all of the chlorine is destroyed with almost no destruction of the chlorine dioxide.

24 Claims, 1 Drawing Sheet

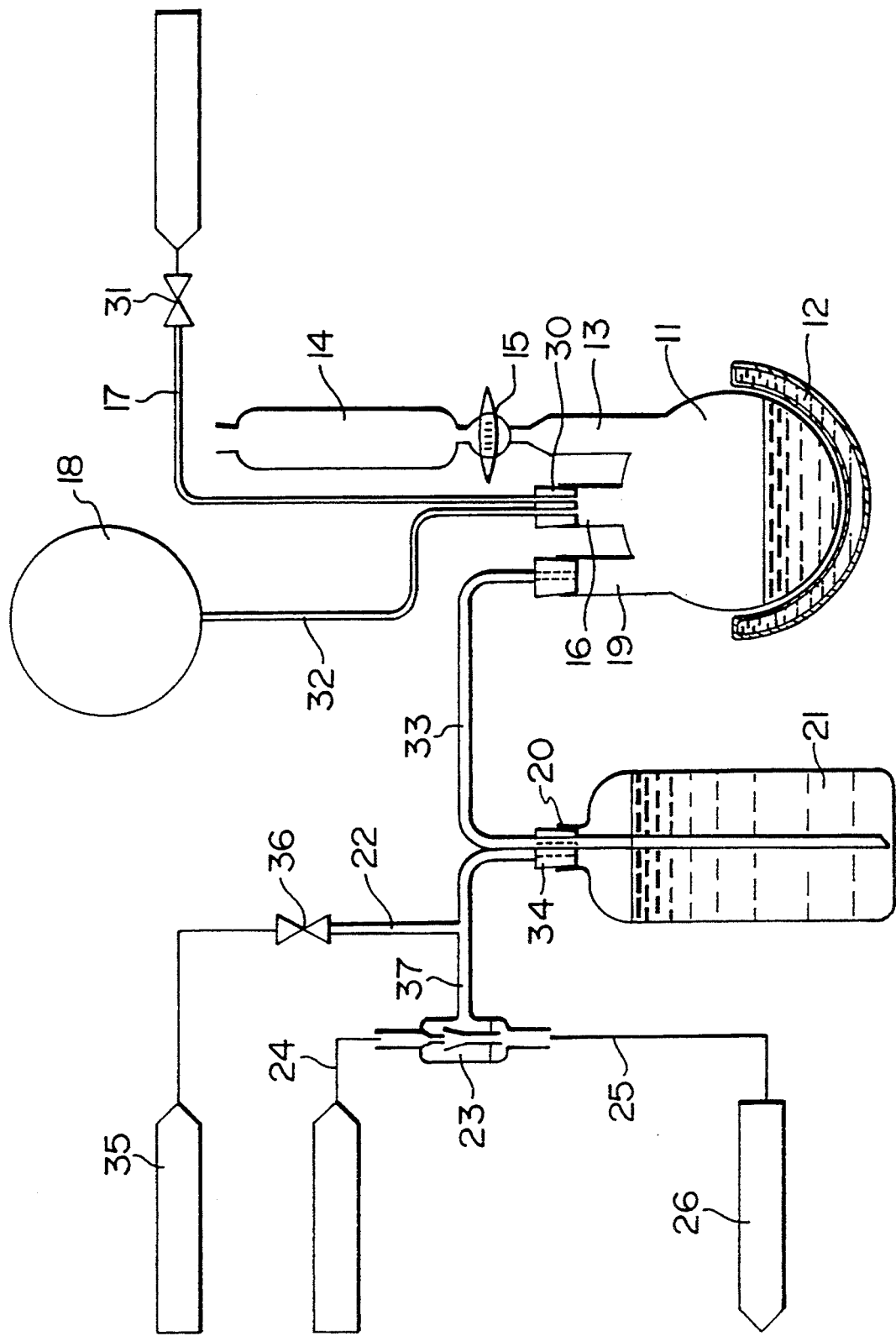

CHLORINE-DESTRUCT METHOD

BACKGROUND OF THE INVENTION (i) Field of the Invention

This invention relates to an integral process for, and to an independent, procedure leading to, the production of an aqueous chlorine dioxide solution containing virtually no chlorine.

(ii) Description of the Prior Art

Various processes which have been proposed heretofore for producing chlorine dioxide yield chlorine dioxide contaminated with chlorine formed as a by-product.

One of such methods for generating chlorine dioxide is to reduce a chlorate with a reducing agent in a strong acid. The reactions which occur are exemplified below, wherein for the sake of illustration, the chlorate used is sodium chlorate and the reducing agent is hydrochloric acid.

$$NaClO_3 + 2HCl \rightarrow ClO_2 + \tfrac{1}{2}Cl_2 + NaCl + H_2O \quad (1)$$

$$NaClO_3 + 6HCl \rightarrow 3Cl_2 + NaCl + 3H_2O \quad (2)$$

Reaction (1) is the desired reaction, while reaction (2) is undesired and produces chlorine only. Catalysts might be found either to speed up reaction (1) or to inhibit reaction (2). However, even if reaction (2) does not proceed, the purity of the chlorine dioxide produced is only $$\frac{1.0 \text{ mole } ClO_2}{1.0 \text{ mole } ClO_2 + 0.5 \text{ mole } Cl_2} \ (100) = 66.7\%, \text{ at most.}$$

In order to purify the chlorine dioxide product to a high degree, the chlorine gas accompanying the chlorine dioxide must be almost completely eliminated from the resulting material. The substantial elimination of the chlorine gas therefrom is very difficult, resulting in the process being costly.

As disclosed by U.S. Pat. No. 2,641,528 issued Jun. 9, 1953 to Max L. Audoynaud, one prior method for producing chlorine dioxide relatively free from chlorine involved changing the basic chemistry, by passing an inert gas into a hot solution of a metallic chlorate in concentrated sulfuric or phosphoric acid. Under these conditions, it was claimed, a gaseous mixture rich in chlorine dioxide and low in chlorine was produced.

U.S. Pat. No. 2,861,871 issued Nov. 25, 1958 to A. Germano, disclosed partial physical separation of produced chlorine from chlorine dioxide by means of selective solubility in the liquid product from the generator.

Other patents, such as the following, mentioned separation of the produced chlorine from produced chlorine dioxide by means of an absorption tower, based on selective solubility in water: U.S. Pat. No. 3,607,027 issued Sep. 21, 1971 to G. O. Westerlund; U.S. Pat. No. 4,137,296 issued Jan. 30, 1979 to D. N. Glew et al; U.S. Pat. No. 4,393,035 issued Jul. 12, 1983 to M. C. J. Fredette; U.S. Pat. No. 4,393,036 issued Jul. 12, 1983 to M. C. J. Fredette; and U.S. Pat. No. 4,543,243 issued Sep. 24, 1985 to H. Frohler et al.

In particular, U.S. Pat. No. 2,871,097 issued Jan. 27, 1959 to William H. Rapson, disclosed the purification of a gaseous mixture of chlorine dioxide and chlorine by treatment with an aqueous solution of sodium chlorite and sodium chlorate. The chlorine reacted with the sodium chlorite to produce more chlorine dioxide, and sodium chloride. However, sodium chlorite is very expensive, and is normally produced from chlorine dioxide.

Yet other patents have been proposed to solve the problem of providing chlorine dioxide solutions having virtually no chlorine by a post-treatment, including the following:

Canadian Patent No. 994,525 issued Aug. 10, 1976 to G. I. Upatnieks et al, which taught the concept of post-treatment involving countercurrent contact of the gaseous mixture of chlorine dioxide and chlorine with an aqueous solution of chlorine dioxide and chlorine which was saturated with respect to chlorine;

Canadian Patent No. 1,118,580 issued Feb. 23, 1982 to D. J. Jaszka et al, which taught the concept of post-treatment involving the use of a mixture of sodium chlorate, sodium chloride and sodium hydroxide at a pH of 4 to 9;

U.S. Pat. No. 2,036,311 issued Apr. 7, 1936 to James F. White, which taught the concept of post-treatment involving the use of aqueous alkali;

U.S. Pat. No. 2,036,375 issued Apr. 7, 1936 to George P. Vincent, which taught the concept of post-treatment involving the use of substantially dry alkali;

U.S. Pat. No. 2,078,045 issued Apr. 20, 1937 to George P. Vincent, which taught the concept of post-treatment involving selectively absorbing gaseous chlorine on lime;

U.S. Pat. No. 2,317,443 issued Apr. 27, 1943 to George L. Cunningham, which taught the concept of post-treatment involving the reaction of chlorine with sulfur and water;

U.S. Pat. No. 2,481,241 issued Sep. 6, 1949 to William H. Rapson et al, which taught the concept of post-treatment involving the addition of gaseous sulfur dioxide; and U.S. Pat. No. 4,216,195 issued Aug. 5, 1980 to D. J. Jaszka et al, which taught the concept of post-treatment involving the use of an aqueous solution of sodium hydroxide as a scrubbing agent.

Specifically, U.S. Pat. No. 2,833,624 issued May 6, 1958 to J. W. Sprauer, provided a procedure involving continuously feeding, in reacting proportions to produce chlorine dioxide, aqueous solutions of a metal chlorate, an inorganic chloride, hydrogen peroxide, and a strong mineral acid into a reaction zone. The solutions were rapidly mixed and the resulting mixture was maintained at a temperature substantially above 70° C. for a time not exceeding 5 minutes. Reacted mixture was continuously removed from the reaction zone at a rate corresponding to the rate of feed of materials thereinto. The reacted mixture was continuously diluted immediately upon removal from the reaction zone to produce continuously and directly dilute chlorine dioxide product solution. The patentee alleged that the reaction was one in which the production of chlorine was suppressed. Therefore even though it taught that hydrogen peroxide can destroy chlorine dioxide, it did not provide a teaching of post-treatment of a mixture of chlorine dioxide/chlorine with hydrogen peroxide to reduce the amount of chlorine therein.

Specifically, also, U.S. Pat. No. 4,421,730 issued Dec. 20, 1983 to I. Isa et al, allegedly provided for the generation of very pure chlorine dioxide very efficiently and safely in a single generator-crystallizer by reducing an alkali metal chlorate with chloride ion in a strong acid in the presence of hydrogen peroxide and a complex catalyst of palladium (II) with chloride ion. That patent taught a reaction whereby it was possible to manufacture highly pure chlorine dioxide efficiently without generating any acid effluent by reducing an alkali metal chlorate with chloride ion in the presence of hydrogen peroxide and the specified complex catalyst in a single generator-crystallizer under a reduced pressure of about 20 to 400 mmHg. This patent thus taught a process in which large amounts of hydrogen peroxide were consumed during the reaction. It did not teach the post treatment of a mixture of chlorine dioxide and chlorine with hydrogen peroxide, to reduce the amount of chlorine therein.

SUMMARY OF THE INVENTION (i) Aims of the Invention

Accordingly, it is a major object of the present invention to provide a post-treatment of an aqueous solution of chlorine dioxide/chlorine, in order significantly to reduce the quantity of chlorine in such aqueous solution.

Another object of the present invention is to provide an integral process for the production of an aqueous chlorine dioxide solution which is substantially free of chlorine.

Yet another object of this invention is to provide an integral process for the production of chlorine dioxide gas substantially-free of chlorine gas.

(ii) Statement of Invention

The present invention provides a post-treatment procedure which comprises the essential step of adding a chlorine-destruct agent selected from the group consisting of hydrogen peroxide, oxalic acid, and a salt of oxalic acid, to a cool aqueous solution of chlorine dioxide and chlorine, thereby providing an aqueous solution of chlorine dioxide substantially free of chlorine.

The present invention also provides a process for selectively removing chlorine from an aqueous solution of chlorine dioxide and chlorine containing more chlorine dioxide than chlorine, the aqueous solution having been prepared by the process of reducing a chlorate with a reducing agent in a strong acid, and dissolving gaseous reaction products in water, which process comprises: adding a sufficient amount of a chlorine destruct agent selected from the group consisting of hydrogen peroxide, oxalic acid and salts of oxalic acid to such aqueous solution of chlorine dioxide and chlorine which is at a temperature of about 0° C. to about 25° C. thereby to destruct significant amounts of chlorine while leaving significant amounts of chlorine dioxide unchanged and thereby providing an aqueous solution of chlorine dioxide having a maximum of about 0.03 grams chlorine per gram chlorine dioxide within a period of less than about 2.5 hours.

The present invention also provides a post-treatment procedure for producing an aqueous solution of chlorine dioxide having a maximum of about 0.03 grams chlorine per gram chlorine dioxide, the post-treatment steps comprising: passing vapors containing chlorine dioxide and chlorine which have been prepared by the process of reducing a chlorate with a reducing agent in a strong acid, through a bath of cool water at a temperature of about 0° C. to about 25° C., thereby dissolving most of the chlorine dioxide gas while dissolving only some of the chlorine gas; purging undissolved chlorine gas and chlorine dioxide gas from the region of the aqueous solution; and adding a chlorine-destruct agent selected from the group consisting of hydrogen peroxide, oxalic acid and salts of oxalic acid to such cool aqueous solution of chlorine dioxide and chlorine at a temperature of about 0° C. to about 25° C., thereby providing such aqueous solution of chlorine dioxide within a period of less than 2.5 hours.

The present invention also provides an integral process for having a maximum of about 0.03 grams chlorine per gram chlorine dioxide comprising: reacting a solution of chlorate salt with hydrochloric acid at a suitable temperature in a suitable reaction zone, to produce vapors of chlorine dioxide and chlorine; withdrawing the vapors of chlorine dioxide and chlorine from the reaction zone; passing the vapors of chlorine dioxide and chlorine through a bath of cool water at a temperature of about 0° C. to about 25° C., thereby dissolving most of the chlorine dioxide while dissolving only some of the chlorine gas; treating such cool aqueous solution of chlorine dioxide and chlorine at a temperature of about 0° C. to about 25° C. with a chlorine-destruct agent selected from the group consisting of hydrogen peroxide, oxalic acid and salts of oxalic acid, thereby providing an aqueous solution of chlorine dioxide having a maximum of about 0.03 grams chlorine per gram chlorine dioxide within a period of less than about 2.5 hours; and recovering chlorine dioxide gas having a maximum of about 0.03 grams chlorine per gram chlorine dioxide from such treated solution.

(iii) Other Features of the Invention

By one feature of each of the three inventive processes of this invention, the temperature of the cool aqueous solution preferably is from about 0° C. to about 15° C., and still more preferably from about 3° C. to about 5° C.

By another feature of each of the three inventive processes of this invention, the amount of the chlorine destruct agent is from about 0.5 to about 1.5 moles per mole of chlorine in the solution.

By another feature of each of the three inventive processes of this invention, the solution initially contains from about 5 to about 20 grams of chlorine dioxide per liter, and preferably initially contains from about 5 to about 12 grams of chlorine dioxide per liter, and from about 0.5 to about 2.0 grams of chlorine per liter.

By still another feature of each of the three inventive processes of this invention, sufficient chlorine destruct agent is used to provide an aqueous solution after treatment containing less than 0.2 grams chlorine per liter within a period of less than about 2.5 hours.

By one preferred feature of each of the three inventive processes of this invention, the chlorine destruct agent is hydrogen peroxide; the temperature of the cool aqueous solution is from about 0° C. to about 15° C.; the solution initially contains from about 5 to about 12 grams of chlorine dioxide per liter; the solution initially contains from about 0.5 to about 2.0 grams of chlorine per liter; and sufficient hydrogen peroxide is used to provide an aqueous solution after treatment of less than 0.2 grams chlorine per liter within a period of less than about 2.5 hours.

By another preferred feature of each of the three inventive processes of this invention, the chlorine destruct agent is oxalic acid or a salt of oxalic acid; the temperature of the cool aqueous solution is from about 0° C. to about 15° C.; the solution initially contains from about 5 to about 12 grams of chlorine dioxide per liter; the solution initially contains from about 0.5 to about 2.0 grams of chlorine per liter; and sufficient hydrogen peroxide is used to provide an aqueous solution after treatment of less than 0.2 grams chlorine per liter within a period of less than about 2.5 hours.

By one feature of the integrated process of this invention, the temperature of reaction of the solution of the chlorate salt with hydrochloric acid is from about 40° C. to about 110° C.

By another feature of the integrated process of this invention, the solution of chlorate salt is a solution of an alkali metal, e.g., sodium chlorate.

Thus by the present invention, in general terms, hydrogen peroxide or oxalic acid or a salt of oxalic acid is added to a cool (i.e. at a temperature of about 0° C. to about 25° C.) aqueous solution of chlorine and chlorine dioxide. The hydrogen peroxide or oxalic acid or salt of oxalic acid reacts preferentially with the chlorine to destroy it (producing HCl and oxygen as by-products). Thus, at the temperature of the cool water, most of the chlorine dioxide is dissolved in the water while only a fraction of the chlorine is dissolved. The undissolved gases are removed. Such physical separation of the chlorine gas from the chlorine dioxide gas prior to the treatment with the chlorine-destruct agent provides significant advantages. Only a fraction of the chlorine produced needs to be destroyed using the chlorine-destruct agent. It was unexpected that the hydrogen peroxide or oxalic acid or salt of oxalic acid should react with the chlorine only, without destroying substantial chlorine dioxide.

BRIEF DESCRIPTION OF THE DRAWINGS

In the accompanying drawings, the single FIGURE is a schematic representation of a laboratory scale batchwise chlorine dioxide generator.

DESCRIPTION OF DRAWING

As shown in the drawing, a three-necked 1000 ml reaction flask 11 is supported on, and is adapted to be heated, by means of a heating mantle 12. One inlet neck 13 of the flask 11 is connected to a 60 ml dropping funnel 14 provided with a control cock 15. A second inlet neck, 16 is provided with a two-hole stopper 30 so as to be connected to an inlet line 17 for atmospheric air controlled by valve 31 and to an exit line 32 to a pressure indicator 18. The third outlet neck 19 is connected by means of line 33 to one inlet of a two-hole stopper 34 in a neck 20 of a one quart brown bottle 21 which is placed in an ice bath, (not shown) the brown bottle 21 being filled with water, so that reaction products (chlorine and chlorine dioxide) can be absorbed into cold water. The bottle 21 is connected by means of line 22 in two-hole stopper 34 to a source of atmospheric air 35, controlled by valve 36 to provide pressure control. Line 22 branches to line 37 which provides a vent line through an ejector 23 fed with water through line 24, to be flushed via line 25 to chemical sewer 26.

In the use of this system, sodium chlorate and hydrogen chloride were reacted at about 60°0 C. During the reaction cock 15 is slightly opened to allow drops of hydrogen chloride solution to react with the sodium chlorate. At the end of the reaction valve 31 is opened to dilute the $Cl_2$ and $ClO_2$ gases to a safe level. The chlorine ($Cl_2$) and chlorine dioxide ($ClO_2$) produced were absorbed into cold water. Analyses for chlorine and chlorine dioxide were done via a potassium iodide/sodium thiosulfate two-part titration.

DESCRIPTION OF PREFERRED EMBODIMENTS

EXAMPLES

Three chlorine destruction trials were performed using the chlorine dioxide/chlorine solution produced using the system and procedure described above.

EXAMPLE 1

An aliquot, 100 ml, of the chlorine dioxide/chlorine solution was transferred into a 117 ml bottle. This solution contained 0.189 g $Cl_2$ plus 0.896 g of $ClO_2$. The solution was cooled to 4° C. to 5° C. in an ice water bath. Hydrogen peroxide solution was added 4.0 ml of 0.723 Molar solution. After 12 minutes, the concentrations of $Cl_2$ and $ClO_2$ were 0.20 and 8.33 gpl, respectively. Therefore, 89% destruction of chlorine was achieved while only 3% of the original chlorine dioxide was lost.

EXAMPLE 2

An aliquot, 100 ml, of the chlorine dioxide/chlorine solution was transferred into a 117 ml bottle. This solution contained 0.189 g $Cl_2$ plus 0.896 g of $ClO_2$. The solution was quickly warmed to 21° C. Hydrogen peroxide solution was added, as 4.0 ml of 0.723 Molar solution. After 12 minutes, the concentrations of $Cl_2$ and $ClO_2$ were 0.27 and 8.15 gpl, respectively. Therefore, 85% of the chlorine was destroyed while only 5% of the original chlorine dioxide was lost.

EXAMPLE 3

An aliquot, 100 ml, of the chlorine dioxide/chlorine solution was transferred into a 117 ml bottle. This solution contained 0.167 g $Cl_2$ plus 0.879 g of $ClO_2$. The solution was cooled to 3° C. to 5° C. in an ice water bath. Hydrogen peroxide solution was added, as 3.6 ml of 0.723 Molar solution. After 73 minutes, the measured concentrations of $Cl_2$ and $ClO_2$ were 0.25 and 7.86 gpl, respectively. Therefore, 84% of the chlorine was destroyed while only 7% of the original chlorine dioxide was lost.

EXAMPLE 4

A solution of chlorine dioxide and chlorine in water was prepared by reacting sodium chlorate and hydrogen chloride at a temperature of 45° C. in a stirred reactor, and collecting the vapors in water. The solutions were stored at 10° C. or lower temperature. During the morning of testing, the solution was analyzed for chlorine dioxide and chlorine. The concentrations were 11.5 and 1.3 grams per liter (gpl), respectively. An aliquot (100 ml) of the solution was transferred into a 117 ml brown bottle kept at 10° C. and then 2.3 ml of a solution of 1.13 Molar hydrogen peroxide was added (providing 1.4 mole $H_2O_2$ per mole $Cl_2$) and mixed gently. Samples were taken periodically and analyzed for chlorine dioxide and chlorine. The first sample taken, 14 minutes after mixing, contained 11.2 gpl of chlorine dioxide and less than 0.2 gpl of chlorine. A subsequent sample, taken after 2.5 hours, contained 11.3 gpl of chlorine dioxide and less than 0.2 gpl of chlorine.

EXAMPLES 5 to 10

The same procedure was carried out as in Example 1, except that varying amounts of hydrogen peroxide were added. Results are listed in Table I. The results show that hydrogen peroxide quickly destroyed about 1 mole of the chlorine per mole of hydrogen peroxide added, leaving most of the chlorine dioxide substantially unchanged.

TABLE I

| Example Number | Amount of $H_2O_2$, mol/(mol Cl2) | Time of Sampling, minutes | $ClO_2$ Concg pl | $Cl_2$ Concg pl |
|---|---|---|---|---|
| 4 | 1.4 | 0 | 11.5 | 1.3 |
|  |  | 14 | 11.2 | 0.0 |
|  |  | 152 | 11.3 | 0.0 |
| 5 | 0.5 | 0 | 8.3 | 1.3 |
|  |  | 48 | 8.2 | 0.7 |
|  |  | 87 | 8.1 | 0.7 |
| 6 | 0.8 | 0 | 9.2 | 1.7 |
|  |  | 8 | 8.4 | 0.3 |
|  |  | 137 | 9.1 | 0.4 |
| 7 | 1.2 | 0 | 11.6 | 1.3 |
|  |  | 13 | 11.4 | 0.0 |
|  |  | 151 | 11.3 | 0.0 |
| 8 | 1.0 | 0 | 11.6 | 1.3 |
|  |  | 5 | 11.0 | 0.1 |
|  |  | 75 | 11.2 | 0.2 |
| 9 | 1.2 | 0 | 10.7 | 1.3 |
|  |  | 6 | 10.2 | 0.0 |
|  |  | 65 | 10.8 | 0.2 |
| 10 | 1.1 | 0 | 10.8 | 1.3 |
|  |  | 5 | 9.9 | 0.1 |
|  |  | 47 | 10.5 | 0.1 |

EXAMPLE 11

The procedure of Example 4 was repeated except that the solvent for the initial solution of chlorine and chlorine dioxide was 0.1 Molar hydrochloric acid instead of water. The original solution contained 8.6 gpl of $ClO_2$ and 0.8 gpl of $Cl_2$. The amount of hydrogen peroxide added was 1.0 mole per mole of chlorine; after 24 minutes, the concentrations of $ClO_2$ and $Cl_2$ were 8.3 and 0.0 gpl, respectively, showing that the presence of dilute hydrochloric acid does not interfere with the process of the invention.

EXAMPLE 12

The procedure of Example 4 was repeated except that sodium hydroxide was substituted for the hydrogen peroxide. The solution before adding the sodium hydroxide contained 10.2 g $ClO_2$ per liter and 1.6 g $Cl_2$ per liter. The amount of sodium hydroxide added was 4.9 mole per mole of $Cl_2$. 8 minutes after adding the sodium hydroxide, the concentrations were 6.4 gpl of chlorine dioxide and 0.1 gpl of chlorine, showing substantial undesirable destruction of the chlorine dioxide, along with desirable destruction of chlorine.

EXAMPLE 13

The procedure of Example 4 was repeated except that formic acid was substituted for the hydrogen peroxide. The amount of formic acid added was 0.94 mole per mole of chlorine. The original concentrations were 9.2 gpl chlorine dioxide and 1.7 gpl chlorine. 152 minutes after mixing with the formic acid, the concentrations were 9.4 gpl chlorine dioxide and 0.6 gpl chlorine, showing that formic acid is not a practical commercial chlorine destruct agent since it reacts rather slowly with the chlorine.

EXAMPLE 14

The procedure of Example 4 was repeated except that methanol was substituted for the hydrogen peroxide. The original solution contained 9.1 gpl chlorine dioxide and 1.6 gpl of chlorine. The amount of methanol added was 1.0 mole per mole of chlorine; 76 minutes after mixing, the concentrations were 9.0 gpl chlorine dioxide and 1.4 gpl chlorine, showing that methanol is not a practical commercial chlorine destruct agent since it reacts very slowly, if at all, at 10° C.

EXAMPLE 15

The procedure of Example 4 was repeated except that oxalic acid was substituted for the hydrogen peroxide. The original solution contained 10.2 gpl of chlorine dioxide and 1.6 gpl of chlorine. The amount of oxalic acid added was 1.2 moles per mole chlorine; 53 minutes after mixing, the concentrations were 10.4 gpl chlorine dioxide and 0.1 gpl chlorine. This shows that oxalic acid, while it is currently more expensive than hydrogen peroxide for this application, performs technically about as well as hydrogen peroxide in destroying chlorine.

EXAMPLE 16

The procedure of Example 4 was repeated except that sulfur dioxide was substituted for the hydrogen peroxide. The original solution contained 9.2 gpl chlorine dioxide and 1.6 gpl of chlorine. 40 minutes after adding 1.0 mole of sulfur dioxide per mole of chlorine, the concentrations were 8.9 gpl chlorine dioxide and 0.6 gpl of chlorine, that sulfur dioxide is not a practical commercial chlorine destruct agent since it shows only partial destruction of the chlorine.

EXAMPLE 17

The procedure of Example 4 was repeated except that urea was substituted for the hydrogen peroxide. The original solution contained 9.7 gpl chlorine dioxide and 1.5 gpl of chlorine. 106 minutes after adding 1.5 mole of urea per mole of chlorine, the concentrations were 9.6 gpl chlorine dioxide and 0.8 gpl of chlorine, showing that urea is not a practical commercial chlorine destruct agent since it shows only partial destruction of the chlorine.

OPERATION OF PREFERRED EMBODIMENTS

The invention in its preferred embodiments provides the following advantages:

a. A chlorine dioxide product is produced which contains virtually no chlorine.

b. The amount of the chlorine-destruct agent, such as hydrogen peroxide, that is required to destroy the residual chlorine does not depend on the efficiency of the chlorine dioxide generator. Instead, most of the produced chlorine is separated from the chlorine dioxide prior to the chemical reduction step by physical means, such as selective absorption in water.

c. By operation of the invention, virtually no chlorine dioxide is destroyed, and therefore expensive sodium chlorate is not consumed wastefully.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A process for selectively removing chlorine from an aqueous solution of chlorine dioxide and chlorine containing more chlorine dioxide than chlorine, said aqueous solution having been prepared by the process of reducing a chlorate with a reducing agent in a strong acid and dissolving gaseous reaction products in water, which process comprises: adding a sufficient amount of a chlorine destruct agent selected from the group consisting of hydrogen peroxide, oxalic acid and salts of oxalic acid to art the aqueous solution of chlorine dioxide and chlorine which is at a temperature of about 0° C. to about 25° C. thereby to destruct significant amounts of chlorine while leaving significant amounts of chlorine dioxide unchanged and providing an aqueous solution of chlorine dioxide having a maximum of about 0.03 grams chlorine per gram chlorine dioxide with a period of less than about 2.5 hours.

2. The process of claim 1 wherein the temperature of said aqueous solution is from about 0° to about 15° C.

3. The process of claim 1 wherein the temperature of said aqueous solution is from about 3° C. to about 5° C.

4. The process of claim 1 wherein said chlorine-destruct agent is hydrogen peroxide; wherein said aqueous solution of chlorine dioxide and chlorine initially contains from about 5 to about 12 grams of chlorine dioxide per liter; wherein said aqueous solution of chlorine dioxide and chlorine initially contains from about 0.5 to about 2.0 grams of chlorine per liter; and wherein sufficient hydrogen peroxide is used to provide an aqueous solution after treatment which consists essentially of less than 0.2 grams chlorine per liter.

5. The process of claim 1 wherein said chlorine-destruct agent is one of oxalic acid and a salt of oxalic acid; wherein said aqueous solution of chlorine dioxide and chlorine initially contains from about 5 to about 12 grams of chlorine dioxide per liter; wherein said aqueous solution Of chlorine dioxide and chlorine initially contains from about 0.5 to about 2.0 grams of chlorine per liter; and wherein a sufficient amount of one of oxalic acid and a salt of oxalic acid is used to provide an aqueous solution after treatment which consists essentially of less than 0.2 grams chlorine per liter.

6. The process of claim 1 wherein the amount of said chlorine destruct agent is from about 0.5 to about 1.5 moles per mole of chlorine in said solution.

7. The process of claim 6 wherein said solution initially contains from about 5 to about 20 grams of chlorine dioxide per liter.

8. The process of claim 6 wherein said solution initially contains from about 5 to about 12 grams of chlorine dioxide per liter.

9. The process of claim 5 wherein said solution initially contains from about 0.5 to about 2.0 grams of chlorine per liter.

10. The process of claim 9 wherein sufficient chlorine-destruct agent is used to provide an aqueous solution after treatment containing less than 0.2 grams chlorine per liter.

11. In a process for producing an aqueous solution of chlorine dioxide having a maximum of about 0.03 grams chlorine per gram chlorine dioxide, the post-treatment steps comprising: passing vapors containing chlorine dioxide and chlorine, said vapors having been prepared by reducing a chlorate with a reducing agent in a strong acid, through a bath of water at a temperature of about 0° C. to about 25° C., thereby dissolving most of the chlorine dioxide while dissolving only some chlorine and providing an aqueous solution of chlorine dioxide and chlorine containing more chlorine dioxide than chlorine; purging undissolved chlorine and chlorine dioxide from a region of the aqueous solution; and adding a chlorine-destruct agent selected from a group consisting of hydrogen peroxide, oxalic acid and salts of oxalic acid to said aqueous solution of chlorine dioxide and chlorine maintained at a temperature of about 0° C. to about 25° C., thereby providing said aqueous solution of chlorine dioxide within a period of less than 2.5 hours.

12. A process for producing chlorine dioxide having a maximum of about 0.03 grams chlorine per gram chlorine dioxide comprising: reacting a solution of chlorate salt with hydrochloric acid at a suitable temperature in a suitable reaction zone, to produce vapors of chlorine dioxide and chlorine; withdrawing said vapors of chlorine dioxide and chlorine from said reaction zone; passing said vapors of chlorine dioxide and chlorine through a bath of water at a temperature of about 0° C. to about 25° C., thereby dissolving most of the chlorine dioxide while dissolving only a fraction of the chlorine and providing an aqueous solution of chlorine dioxide and chlorine containing more chlorine dioxide than chlorine; treating said aqueous solution of chlorine dioxide and chlorine with a chlorine-destruct agent selected from a group consisting of hydrogen peroxide, oxalic acid and salts of oxalic acid, thereby providing an aqueous solution of chlorine dioxide containing a maximum of about 0.03 grams chlorine per gram chlorine dioxides within a period of less than about 2.5 hours; and recovering chlorine dioxide gas having a maximum of about 0.03 grams of chlorine per gram of chlorine dioxide from said treated aqueous solution.

13. The process of claim 12 wherein the reaction temperature the solution of the chlorate salt with hydrochloric acid is from about 40° C. to about 110° C., 14. The process of claim 13 wherein said chlorate salt is an alkali metal salt.

15. The process of claim 14 wherein said alkali metal salt is in the form of a solution of sodium chlorate., 16. The process of claim 12 wherein the temperature of said aqueous solution of chlorine dioxide and chlorine is from about 0° C. to about 15° C.

17. The process of claim 12 wherein the temperature of said aqueous solution of chlorine dioxide and chlorine is from about 3° C. to about 5° C.

18. The process of claim 14 wherein the amount of said chlorine destruct agent is from about 0.5 to about 1.5 moles per mole of chlorine in said aqueous solution of chlorine dioxide and chlorine.

19. The process of claim 12 wherein said aqueous solution of chlorine dioxide and chlorine initially contains from about 5 to about 20 grams of chlorine dioxide per liter.

20. The process of claim 12 wherein said aqueous solution of chlorine dioxide and chlorine initially contains from about 5 to about 12 grams of chlorine dioxide per liter.

21. The process of claim 12 wherein said aqueous solution of chlorine dioxide and chlorine initially contains from about 0.5 to about 2.0 grams of chlorine per liter.

22. The process of claim 12 wherein sufficient chlorine destruct agent is used to provide an aqueous solution after treatment consisting essentially of chlorine dioxide containing less than 0.2 grams chlorine per liter.

23. The process of claim 12 wherein said chlorine destruct agent is hydrogen peroxide; wherein the temperature of said aqueous solution is from about 0° C. to about 15° C.; wherein said aqueous solution of chlorine dioxide and chlorine initially contains from about 5 to about 12 grams of chlorine dioxide per liter; wherein said aqueous solution of chlorine dioxide and chlorine initially contains from about 0.5 to about 2.0 grams of chlorine per liter; and wherein sufficient hydrogen peroxide is used to provide an aqueous solution after treatment which consists essentially of chlorine dioxide containing less than 0.2 grams chlorine per liter.

24. The process of claim 12 wherein said chlorine destruct agent is one of oxalic acid and a salt of oxalic acid; wherein the temperature of said aqueous solution of chlorine dioxide and chlorine is from about 0° C. to about 15° C.; wherein said aqueous solution of chlorine dioxide and chlorine initially contains from about 5 to about 12 grams of chlorine dioxide per liter; wherein said aqueous solution of chlorine dioxide and chlorine initially contains from about 0.5 to about 2.0 grams of chlorine per liter; and wherein a sufficient amount of one of oxalic acid and a salt of oxalic acid is used to provide an aqueous solution after treatment which consists essentially of less than 0.2 grams chlorine per liter.

* * * * *